March 6, 1962 G. TSCHENTSCHEL 3,023,678
CORNER MOUNTING AND METHOD OF MAKING THE SAME
Original Filed May 23, 1955 3 Sheets-Sheet 1

INVENTOR.
Gerold Tschentschel
BY Michael S. Striker
 agt.

March 6, 1962 G. TSCHENTSCHEL 3,023,678
CORNER MOUNTING AND METHOD OF MAKING THE SAME
Original Filed May 23, 1955 3 Sheets-Sheet 2
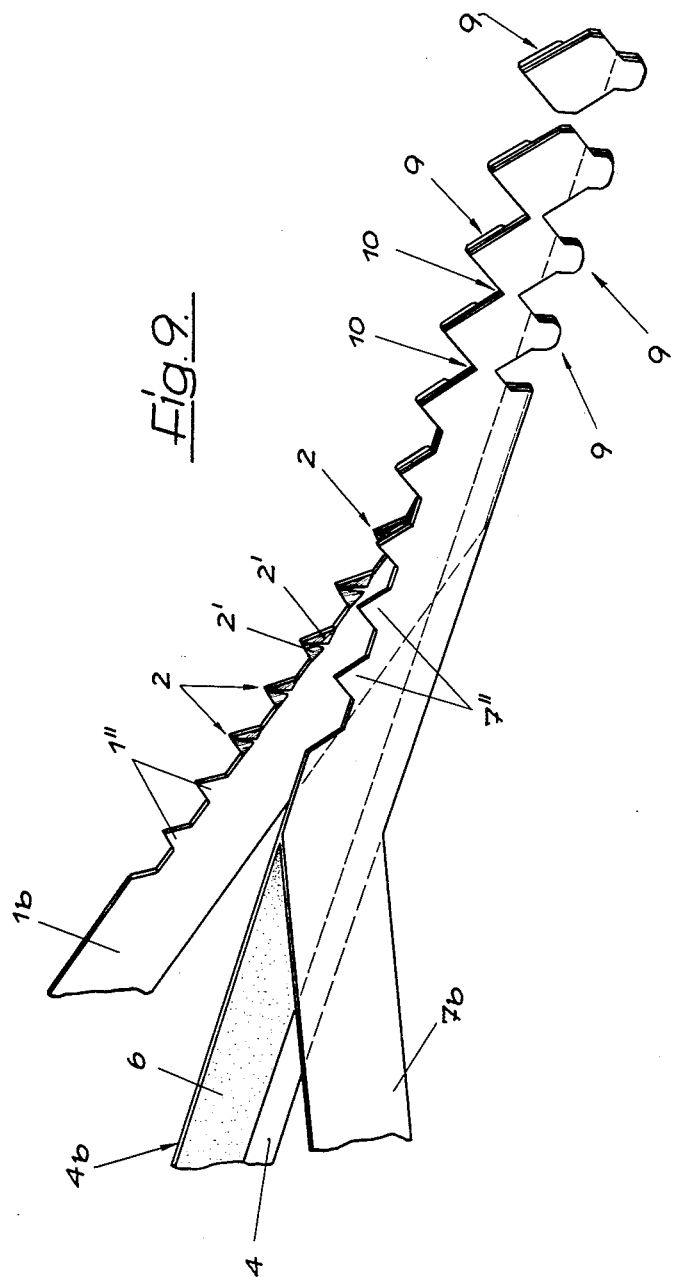
INVENTOR.
Gerold Tschentschel
BY Michael S. Striker
agt.

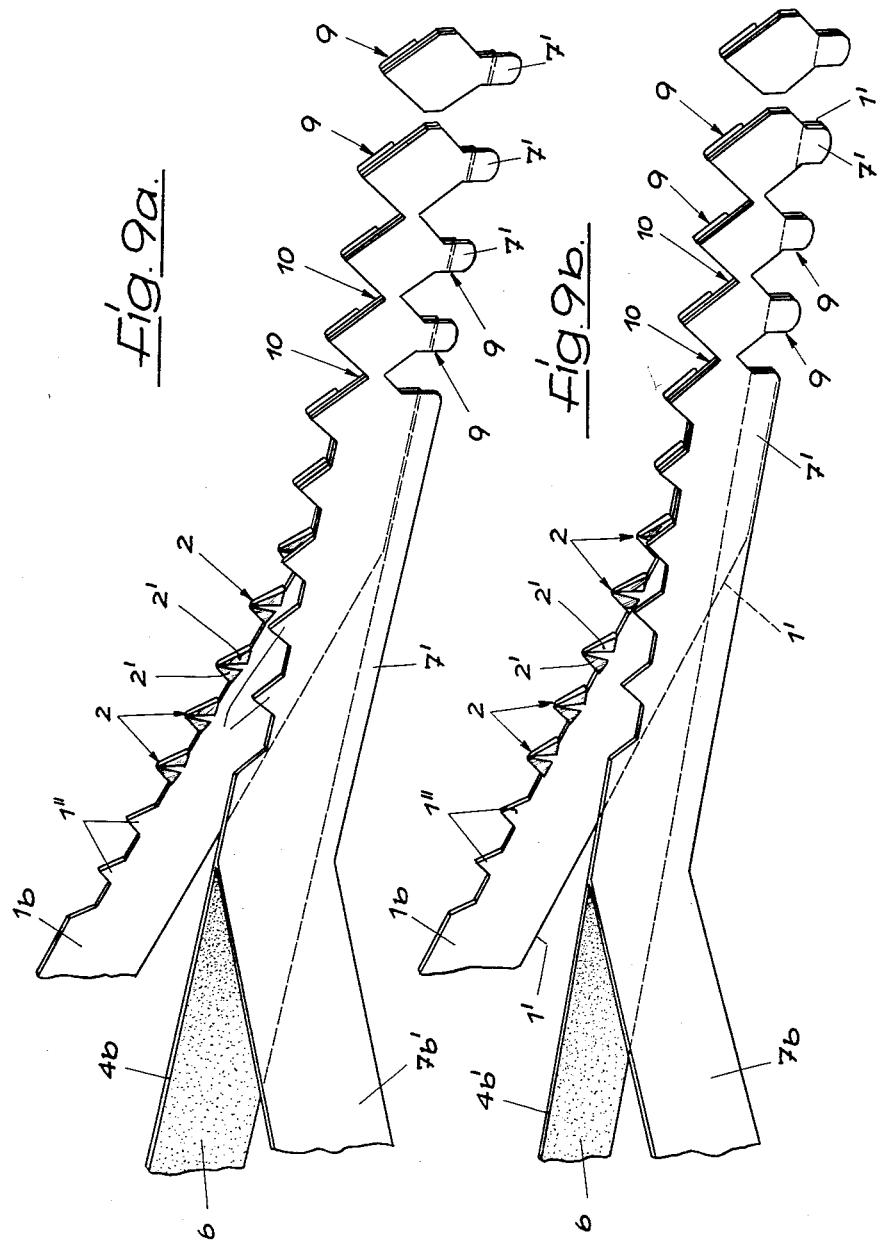

3,023,678
CORNER MOUNTING AND METHOD OF MAKING THE SAME

Gerold Tschentschel, Stuttgart-Sillenbuch, Germany, assignor to Firma Heinrich Hermann, Stuttgart-Wangen, Germany
Original application May 23, 1955, Ser. No. 510,196. Divided and this application Dec. 13, 1956, Ser. No. 631,010
Claims priority, application Germany June 2, 1954
4 Claims. (Cl. 93—1)

The present invention relates to an adhesive carrying article and more particularly to a corner mounting to be attached by sticky adhesive material and into which the corners of a picture or the like are adapted to be inserted and to a method of making the same.

The present application is a division of the application filed May 23, 1955, under Serial No. 510,196, now abandoned.

Such corner mountings are used to attach photographs or the like for instance to pages of albums.

One object of the present invention is to provide a covering for the adhesive material on the corner mounting so that these corner mountings will not inadvertently stick together.

A further object of the present invention is to provide a covering for the adhesive material on the corner mounting which can easily be detached from the adhesive material to uncover the same.

An additional object of the present invention is to provide a method by which such corner mountings can be made in an efficient and economical manner.

With these objects in view, the present invention mainly consists in a corner mounting having a first sheet having a front face and a rear face, a coating of sticky adhesive material fixed to and covering at least partly one of the faces of the first sheet, and a second sheet of non-fibrous material having a first portion engaging and covering the adhesive coating and a second portion extending beyond the adhesive coating so that the second sheet can be easily peeled off the adhesive coating to uncover the same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 9 schematically illustrates a method for making corner mountings according to the present invention;

FIG. 9a schematically illustrates a modified method for making corner mountings according to the present invention; and FIG. 9b shows another modification of such a method.

Figure 1:
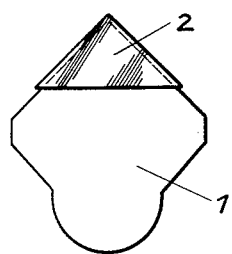
FIG. 1 shows a front view of a corner mounting according to the present invention.
Figure 2:
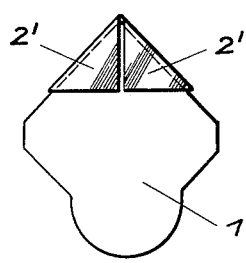
FIG. 2 shows a rear view of a partially finished cover mounting according to the present invention.
Figure 3:
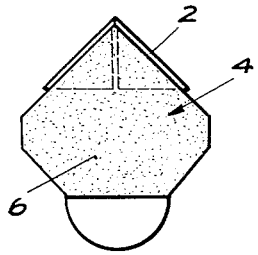
FIG. 3 shows a rear view of a corner mounting according to the present invention ready to be attached.
Figure 5:
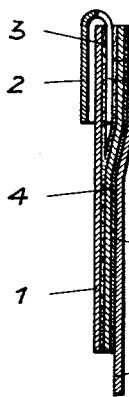
FIG. 5 shows a longitudinal section through a corner mounting made according to the present invention.
Figure 6:
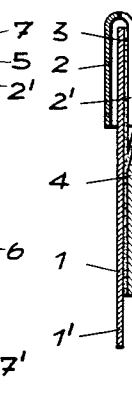
FIGS. 6–8 show longitudinal sections through different modifications of corner mountings according to the present invention.
Figure 7:
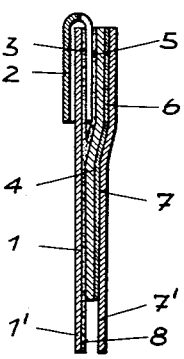
Figure 8:
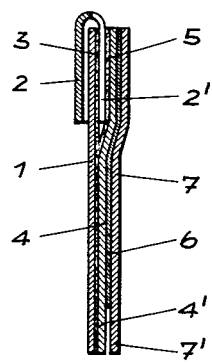

Referring now to the drawings and especially to FIG. 1 which shows a corner mounting of a well known form comprising a base sheet 1 having an upper corner which is covered by a corner cap 2 preferably made from transparent material. The front portion of this corner cap is, as can be clearly seen from the sections illustrated in FIGS. 5–8, spaced from the base sheet and has two flaps 2' which are bent around the edges of the base sheet forming the corner and which are attached by a layer of cement 3 or in any other convenient manner to the rear face of the base sheet as can be clearly seen from FIG. 2. The rear faces of the two flaps and the rear face of the base sheet are covered by a first cover sheet 4 which is attached to these rear faces by means of adhesive 5, as can be clearly seen from the cross sections of FIGS. 5–8. This first cover sheet 4 may cover the base sheet 1 completely as shown in the cross sections of FIGS. 5 and 8, or it may stop short of the bottom edge of the base sheet as shown in the cross-sections of FIGS. 6 and 7 so that the portion 1' of the base sheet extends beyond of and is being left uncovered by said first cover sheet. The rear face of the first cover sheet, that is the face opposite to the face attached to the base sheet, is covered with a coating of sticky adhesive material 6. This coating of sticky adhesive material may cover the rear face of the first cover sheet 4 completely as shown in the sections of FIGS. 5–7 or it may stop short of the bottom edge of this first cover sheet so that a portion 4' of the same is left uncovered by this adhesive material as shown in FIG. 8. The coating of sticky adhesive material may be made from a mixture of polybutenes of different molecular weights for instance in the following proportions:

20 parts by weight of polybutenes of molecular weight of 90,000–100,000, 20 parts by weight of polybutenes of molecular weight of about 10,000, 10 parts by weight of polybutenes of molecular weight of about 3,000.

Or the coating may be made from a mixture of polyvinylethers of different molecular weights with dibutylphthalate for instance in the following proportions:

24 parts by weight of Oppanol C,
16 parts by weight of Lutonal,
2.0 parts by weight of dibutylphthalate.

To prevent that the corner mounting, provided on its rear face with a coating of sticky adhesive material, inadvertently gets attached to an undesirable object or that such corner mountings are getting attached to each other when they are laying in a box, the sticky coating 6 is covered by a second cover sheet 7 made of non-fibrous material. In order to detach this second cover sheet easily from the coating of sticky adhesive a portion 7' of this second cover sheet extends beyond the coating. Therefore the second cover sheet can easily be grasped by the portion 7' and can then be peeled off the coating of the adhesive 6 to make it accessible.

Several modifications are possible to arrange the portion 7' of the second cover sheet 7 so that this portion can be easily grasped.

FIG. 5 shows a cross section through one modification in which the first cover sheet 4 extends completely over the base sheet 1 and is on its rear face completely covered with the sticky adhesive material 6 and in this case the second cover sheet 7 extends with its portion 7' beyond the unit formed by the base sheet 1, the first cover sheet 4, and the coating of sticky adhesive material 6.

In the modification shown in FIGS. 6 and 7, the first cover sheet 4 and the coating of sticky adhesive material 6 which covers its rear face stops short of the bottom edge of the base sheet 1 so that the second cover sheet 7 which has in this case the same dimensions as the base sheet 1 extends with a portion 7' beyond the coating 6 as can be clearly seen from the FIGS. 6 and 7. This portion 7' can be easily grasped and the second cover sheet 7 can therefore be easily peeled off the coating. The modification shown in FIG. 7 differs from the one shown in FIG. 6 only in so far as the rear face of the portion 1' of the base sheet 1 extending beyond the first cover sheet 4 is also covered with a coating of adhesive material 8 so that this lower portion 1' can also be securely attached when the corner mounting is used.

FIG. 8 shows a further modification in which the base sheet 1, the first cover sheet 4, and the second cover sheet 7, have the same dimensions, but wherein the coating of sticky adhesive material 6 stops short of the bottom edge of the first cover sheet 4 so that a portion 4' of the same is left uncovered by the coating 6. Therefore, in this case too, a portion 7' of the second cover sheet 7 remains unattached to the other parts of the corner mounting and the second cover sheet 7 can be easily peeled off from the coating 6 by grasping the portion 7'.

Figure 4:
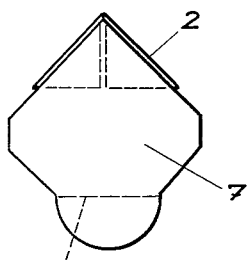
FIG. 4 shows a rear view of a corner mounting according to the present invention with the adhesive material covered.
Figure 4A:
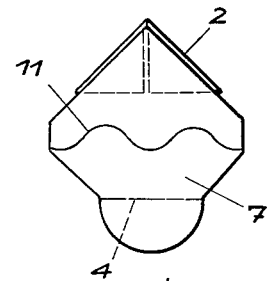
FIG. 4a shows a rear view of a modification of a corner mounting according to the present invention with the adhesive material covered.

Another way of facilitating the peeling off of the second cover sheet 7 from the remainder of the corner mounting is to separate said cover sheet 7 in two parts by a preferable transversal cut along a line 11 as shown in FIG. 4a. This line has preferably a wavy shape as shown in FIG. 4a, but it may also have a zig-zag shape or be a straight line. In this case the cover sheet is detached by bending the corner mounting along the line of separation 11 so that the adjacent edge portions of the two parts of the second cover sheet will detach themselves from the adhesive coating 6 and can be easily grasped to peel two parts off the coating.

FIG. 9 schematically illustrates a process of making the corner mountings described above. For this purpose a band 4b is provided on one of its faces with a continuous coating 6 in such a way that a continuous edge portion 4' of equal width is left uncovered by the coating 6. A second band 7b of non-fibrous material and of equal width as the band 4b is then pressed against the coating 6 on the band 4b in such a way that the edges of the two bands line up with each other. The second band 7b becomes thereby attached to the first band 4b except for its edge portion facing the edge portion 4' of the band 4b. The two bands thus united are then cut along their edge portion opposite the edge portion 4' along a line forming spaced corners 7" as shown in FIG. 9. A third band 1b is also cut along one of its edge portions to form corners 1" of identical outline and equally spaced from each other as the corners 7". Corner caps 2 are then put over the corners 1" and the rear flaps 2' of the corner caps are then respectively attached to the band 1b. The face of the band 1b to which the flaps 2' of the corner caps 2 are attached is then cemented or fixed in any other convenient manner to the face of the band 4b which is not coated, in such a manner that the corners 1" line up with the corners 7". Finally the thus formed unit is cut to form corner mountings 9 whereby these corner mountings may be attached to each other at their lateral portions as shown at 10, or they may be completely separated from each other. In the first case the corner mountings are shipped in form of a continuous band from which the individual mountings are torn off just before they are used. In the second case a completely finished product, ready for use, is fabricated. By the method just described, corner mountings having the cross-section as shown in FIG. 8 are made.

As described above, corner mountings according to the present invention can be produced in various modifications.

To produce corner mountings, having a cross-section as illustrated in FIG. 5, a method differing slightly from the above-described method is used. In this case the band 4b is completely covered with a coating of sticky adhesive as shown in FIG. 9a and the band 7b' which is united with the band 7b exactly in the same way as described above, is wider than the band 4b so that when the two bands are united with their top edges lining up an edge portion 7' extends beyond the lower edge of the band 4b and remains unattached to the same. Otherwise, the method shown in FIG. 9a proceeds exactly as above described. The top edges of the band are cut to provide space corner 7", the band 1b is cut along its top edge to provide spaced corners 1" and is afterwards provided with the corner caps 2 and united by cementing, or in any other convenient manner to the unit formed of the bands 4b and 7b'. The thus formed strip is then cut to the final shape of the corner mountings which may be attached at their lateral portions 10 or which may be completely separated from each other. The finished corner mountings 9 are provided with flaps 7' which extend beyond the remainder of the corner mountings and by which the cover sheet covering the coating of sticky adhesive can be easily grasped and peeled off the same.

A third method differing slightly from the just described two methods is schematically illustrated in FIG. 9b. In this case, the band 4b' is made of smaller width than the two other bands 7b and 1b. The face of the band 4b' in this case which faces the band 7b is completely covered with a coating of sticky adhesive material 6. The bands 4b' and 7b are then again united with their top edges lining up and as the band 4b has a smaller width than the band 7b a portion 7' of the band 7b extends beyond the bottom edge of the band 4b' and remains unattached to the same. From there on the method shown in FIG. 9b is exactly the same as the methods just described in connection with FIGS. 9 and 9a. As the band 1b has the same width as the band 7b it is clear that a portion 1' of the first band extends also beyond the bottom edge of the band 4b' and remains unattached to the same. Corner mountings having a cross section as shown in FIGS. 6 and 7 are produced according to the method just described. The portion 1' of the band 1b may be left uncoated to produce corner mountings with the cross-section as shown in FIG. 6 or this portion may be coated with adhesive material preferably before the band 1b is united with the other two bands to provide corner mountings with the cross section as shown in FIG. 7.

The band 7b may also be provided with a longitudinal cut line to produce corner mountings as illustrated in FIG. 4a which cut line may be of wavy shape as shown in this figure, or may be made along a zigzag or straight line.

Instead of cementing the two bands 1b and 4b or 4b' to each other, these two bands may also be united by providing a thin thermoplastic layer between these two bands or by providing a thermoplastic coating on the face of one of the bands facing the other band and the two bands may then be heat-sealed to each other.

It is further possible to make the bands 1b and/or 4b themselves from thermoplastic material and heat-seal the same together.

It will be understood that each of the elements described above, or two or more together, may also find a useful application in other types of corner mountings and processes of making the same differing from the types described above.

While the invention has been illustrated and described as embodied in a corner mounting to be attached by sticky adhesive material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential char-

What is claimed as new and desired to be secured by Letters Patent is:

1. A process for making corner mountings into which the corners of a picture or the like are adapted to be inserted, comprising the steps of applying a sticky adhesive coating to one face of an elongated first strip at all parts of said face; placing against said coating a second elongated strip of non-fibrous material and of a width greater than the width of said first strip and in a position where said second strip entirely overlaps said first strip and extends beyond the bottom edge thereof; cutting out parts from said thus-united strips so that said united strips have distributed along one common edge a plurality of mutually spaced, substantially pointed portions; preparing a third elongated strip of substantially the same width as said first strip and having distributed along one edge a plurality of mutually spaced, substantially pointed portions in the same manner as said first and second strips; placing a plurality of corner caps respectively onto the pointed portions of said third strip; fixing said third strip in alignment with said first strip and to the face thereof opposite from said coating so as to assure proper superimposition of said strips and so as to fix said caps between said first and third strips; and cutting away portions of the thus-united strips along the edges opposite said caps to provide a series of corner mountings of desired configuration which are attached to each other at their lateral portions.

2. A process for making corner mountings into which the corners of a picture or the like are adapted to be inserted, comprising the steps of applying a sticky adhesive coating to one face of an elongated first strip at all parts of said face; placing against said coating a second elongated strip of non-fibrous material and of a width greater than the width of said first strip and in a position where said second strip entirely overlaps said first strip and extends beyond the bottom edge thereof; cutting out parts from said thus-united strips so that said united strips have distributed along one common edge a plurality of mutually spaced, substantially pointed portions; preparing a third elongated strip of substantially the same width as said first strip and having distributed along one edge a plurality of mutually spaced, substantially pointed portions in the same manner as said first and second strips; placing a plurality of corner caps respectively onto the pointed portions of said third strip; fixing said third strip in alignment with said first strip and to the face thereof opposite from said coating so as to assure proper superimposition of said strips and so as to fix said caps between said first and third strips; cutting away portions of the thus-united strips along the edges opposite said caps to provide a series of corner mountings of desired configuration which are attached to each other at their lateral portions; and then cutting the strips at said lateral portions to separate said mountings from each other.

3. A process for making corner mountings into which the corners of a picture or the like are adapted to be inserted, comprising the steps of applying a sticky adhesive coating to one face of an elongated first strip at all parts of said face; placing against said coating a second elongated strip of non-fibrous material and of a width greater than the width of said first strip and in a position where said second strip entirely overlaps said first strip and extends beyond the bottom edge thereof; cutting out parts from said thus-united strips so that said united strips have distributed along one common edge a plurality of mutually spaced, substantially pointed portions; preparing a third elongated strip of substantially the same width as said second strip and having distributed along one edge a plurality of mutually spaced, substantially pointed portions in the same manner as said first and second strips; placing a plurality of corner caps respectively onto the pointed portions of said third strip; fixing said third strip in alignment with said first strip and to the face thereof opposite from said coating so as to assure proper superimposition of said strips and so as to fix said caps between said first and third strips; and cutting away portions of the thus-united strips along the edges opposite said caps to provide a series of corner mountings of desired configuration which are attached to each other at their lateral portions.

4. A process for making corner mountings into which the corners of a picture or the like are adapted to be inserted, comprising the steps of applying a sticky adhesive coating to one face of an elongated first strip at all parts of said face; placing against said coating a second elongated strip of non-fibrous material and of a width greater than the width of said first strip and in a position where said second strip entirely overlaps said first strip and extends beyond the bottom edge thereof; cutting out parts from said thus-united strips so that said united strips have distributed along one common edge a plurality of mutually spaced, substantially pointed portions; preparing a third elongated strip of substantially the same width as said second strip and having distributed along one edge a plurality of mutually spaced, substantially pointed portions in the same manner as said first and second strips; placing a plurality of corner caps onto the pointed portions of said third strip, fixing said third strip in alignment with said first strip and to the face thereof opposite from said coating so as to assure proper superimposition of said strips and so as to fix said caps between said first and third strips; cutting away portions of the thus-united strips along the edges opposite said caps to provide a series of corner mountings of desired configuration which are attached to each other at their lateral portions; and then cutting the strips at said lateral portions to separate said mountings from each other.

References Cited in the file of this patent
UNITED STATES PATENTS

| | | |
|---|---|---|
| 2,030,135 | Carpenter | Feb. 11, 1936 |
| 2,622,055 | Lieder | Dec. 16, 1952 |

FOREIGN PATENTS

| | | |
|---|---|---|
| 575,353 | Great Britain | Feb. 11, 1946 |